April 22, 1958     A. H. GOREY     2,831,414
SHUTTER FOR PHOTOGRAPHIC CAMERA
Original Filed March 3, 1950     4 Sheets-Sheet 1
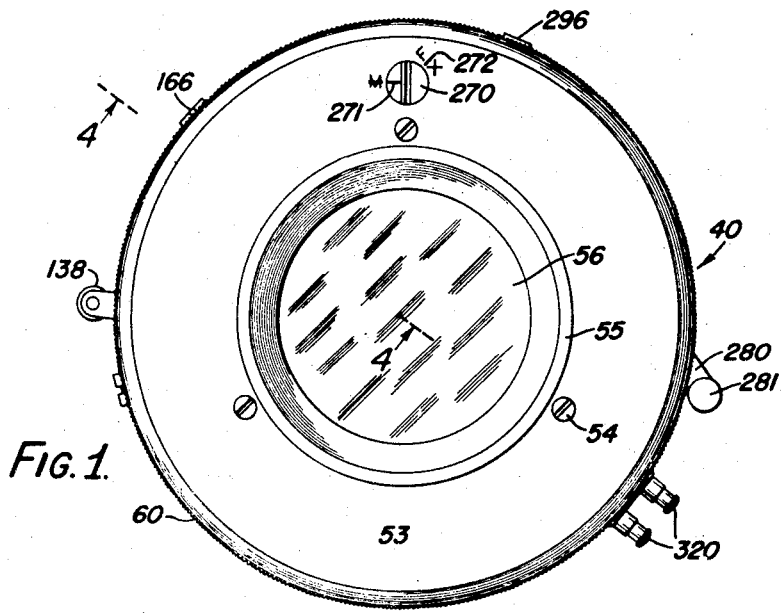
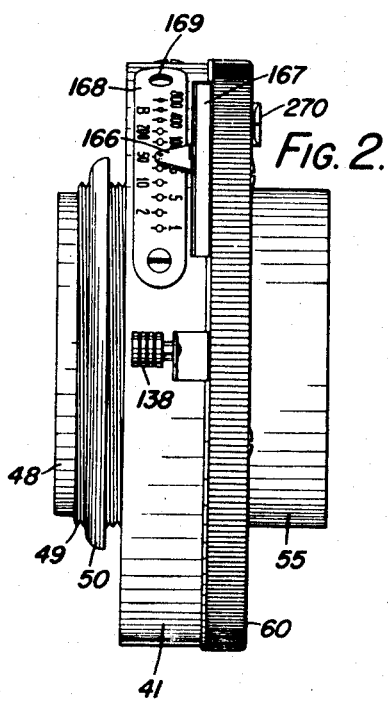
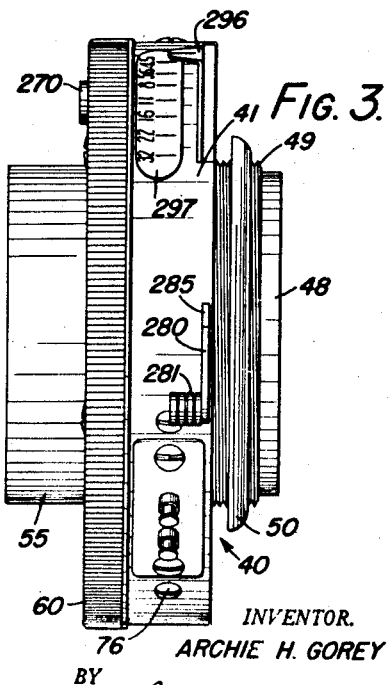
INVENTOR.
ARCHIE H. GOREY
BY
ATTORNEY April 22, 1958  A. H. GOREY  2,831,414
SHUTTER FOR PHOTOGRAPHIC CAMERA
Original Filed March 3, 1950  4 Sheets-Sheet 2

INVENTOR.
ARCHIE H. GOREY
BY
ATTORNEY

April 22, 1958     A. H. GOREY     2,831,414

SHUTTER FOR PHOTOGRAPHIC CAMERA

Original Filed March 3, 1950     4 Sheets-Sheet 3

INVENTOR.
ARCHIE H. GOREY

BY

ATTORNEY

April 22, 1958 A. H. GOREY 2,831,414
SHUTTER FOR PHOTOGRAPHIC CAMERA
Original Filed March 3, 1950 4 Sheets-Sheet 4
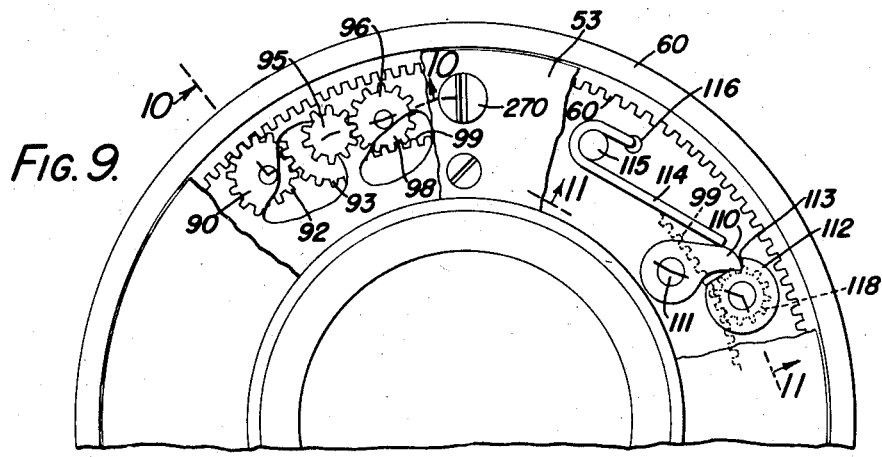
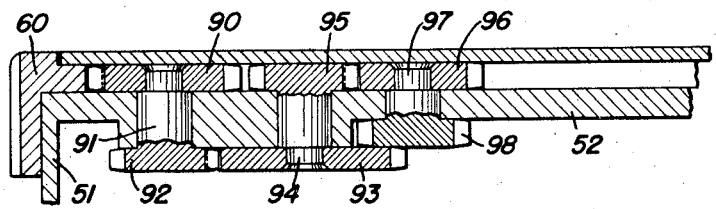
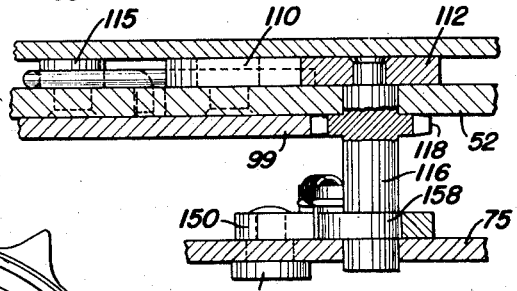
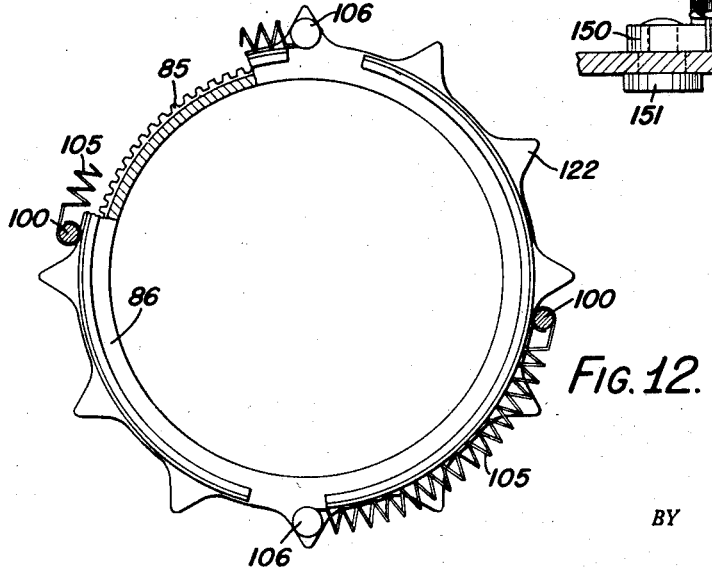
INVENTOR.
ARCHIE H. GOREY
BY
ATTORNEY United States Patent Office 2,831,414
Patented Apr. 22, 1958

2,831,414

SHUTTER FOR PHOTOGRAPHIC CAMERA

Archie H. Gorey, Irondequoit, N. Y., assignor to Graflex, Inc., Rochester, N. Y., a corporation of Delaware Original application March 3, 1950, Serial No. 147,481, now Patent No. 2,701,992, dated February 15, 1955. Divided and this application December 1, 1954, Serial No. 472,320

2 Claims. (Cl. 95—63)

The present invention relates to shutter mechanism for photographic cameras, and more particularly to a between-the-lens shutter. This application is a division of my pending U. S. patent application, Serial No. 147,481, filed March 3, 1950, now Patent No. 2,701,992.

The primary object of the present invention is to provide simple mechanism for opening the shutter blades to focusing position.

Another object of the invention is to provide means whereby the same mechanism, which operates the shutter blades to successively open and close these blades in a picture-taking process, may be used, also, first to open the blades for focusing, and then to close them again, when the focusing is completed.

Another object of the invention is to provide a so-called "press-focusing" mechanism which requires only a simple, manual movement of a lever in one direction to open the shutter blades, and only a simple, manual movement of that lever in the opposite direction to close the shutter blades down again.

Other objects of the invention will be apparent hereinafter from the specification and from the recital of the appended claims.

In the drawings:

Fig. 1 is a front elevation of a between-the-lens shutter made according to one embodiment of this invention;

Fig. 2 is a side elevation of this between-the-lens shutter looking at the shutter from the left hand side of Fig. 1;

Fig. 3 is a side elevation of the shutter looking from the right hand side of Fig. 1;

Fig. 9 is a fragmentary end view on an enlarged scale, with parts broken away, showing the gearing of the shutter winding mechanism, and one of the detents for holding the shutter in wound position;

Fig. 10 is a section on the line 10—10 of Fig. 9 on a greatly enlarged scale and looking in the direction of the arrows;

Fig. 11 is a fragmentary sectional view also on an enlarged scale taken generally on the line 11—11 of Fig. 9; and Fig. 12 is a detail view showing the drive gear and the toothed wheel associated therewith, parts being broken away.

Figure 4:
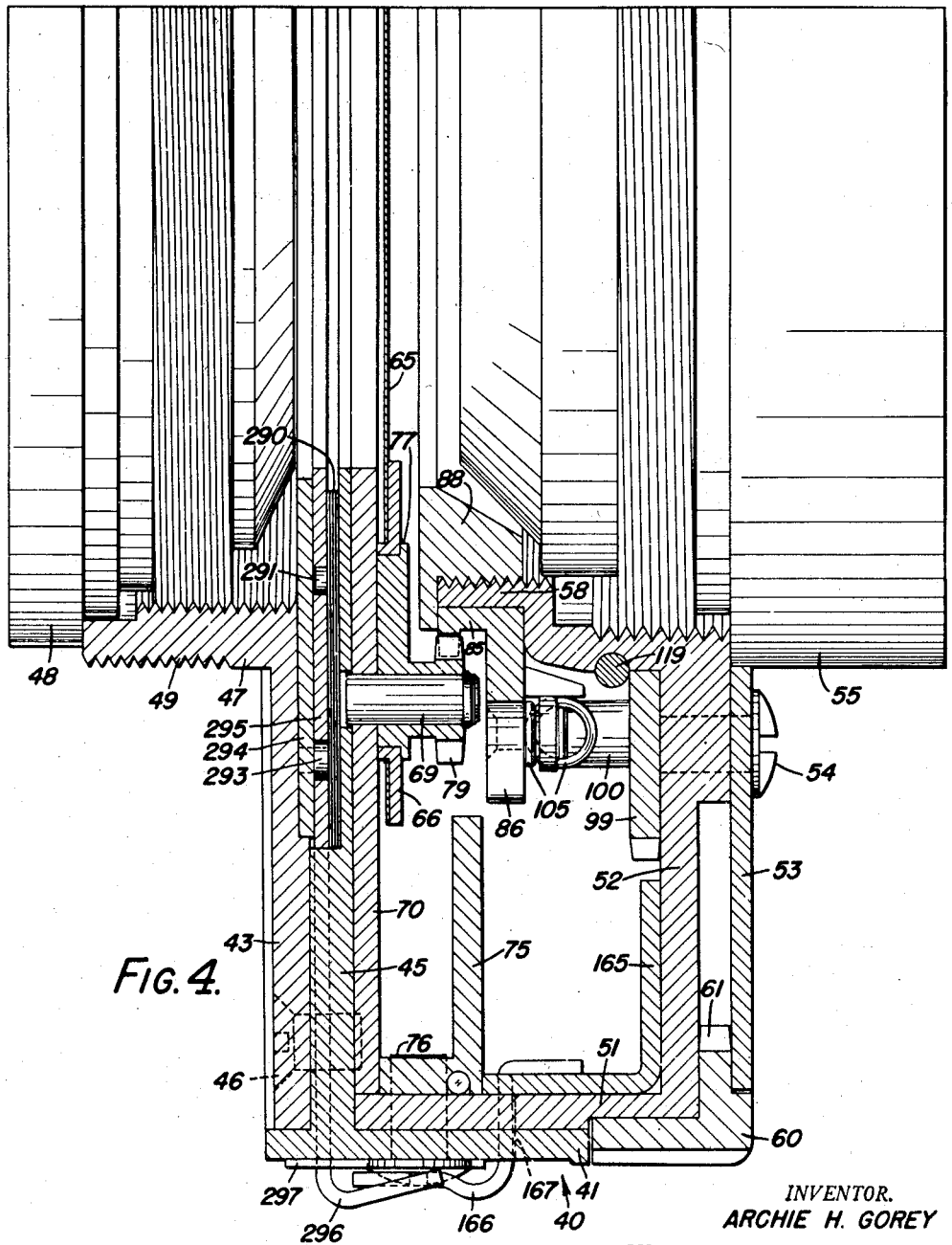
Fig. 4 is a fragmentary axial sectional view through the shutter taken substantially on the line 4—4 of Fig. 1 and on a greatly enlarged scale.

Referring now to the drawings by numerals of reference, 40 denotes the shutter generally. The shutter mechanism is encased within a cylindrical body or housing 41 (Figs. 1, 2, 3 and 4) that is formed with an internally projecting, circular flange 45 (Fig. 4). The casing 43 for the back lens element 48 is formed with a flange portion that seats against the flange 45 of housing 41 and that is secured to flange 45 by screws 46. The lens casing 43 is formed with an axially extending, cylindrical flange 47 that is threaded internally to receive the back lens element 48, and that is threaded externally, as denoted at 49, to thread into the lens board (not shown) of the camera. A clamping disc 50 (Figs. 2 and 3), which threads onto the portion 49, serves to clamp the mounting 40 to the lens board.

Mounted within the casing 41 is the casing 52 (Fig. 4) for the front lens element 55 of the mounting. The casing 52 is formed with an axially-extending cylindrical portion 51 which fits tightly within the casing 41 and is secured against relative movement thereto. The casing 52 is also formed with a cylindrical flange portion 58, which is concentric with and lies radially within flange 51 and which is internally threaded to receive the front lens element 55. Secured to the casing member 52 by screws 54 is a front cover plate 53.

Rotatably mounted on the flange portion 51 of the casing 52 is a wind-up ring 60. This ring has a knurled outer peripheral surface; and it has an internal gear 61 integral with it which projects into the space between the cover plate 53 and the parallel portion of lens casing 52.

Figure 5:
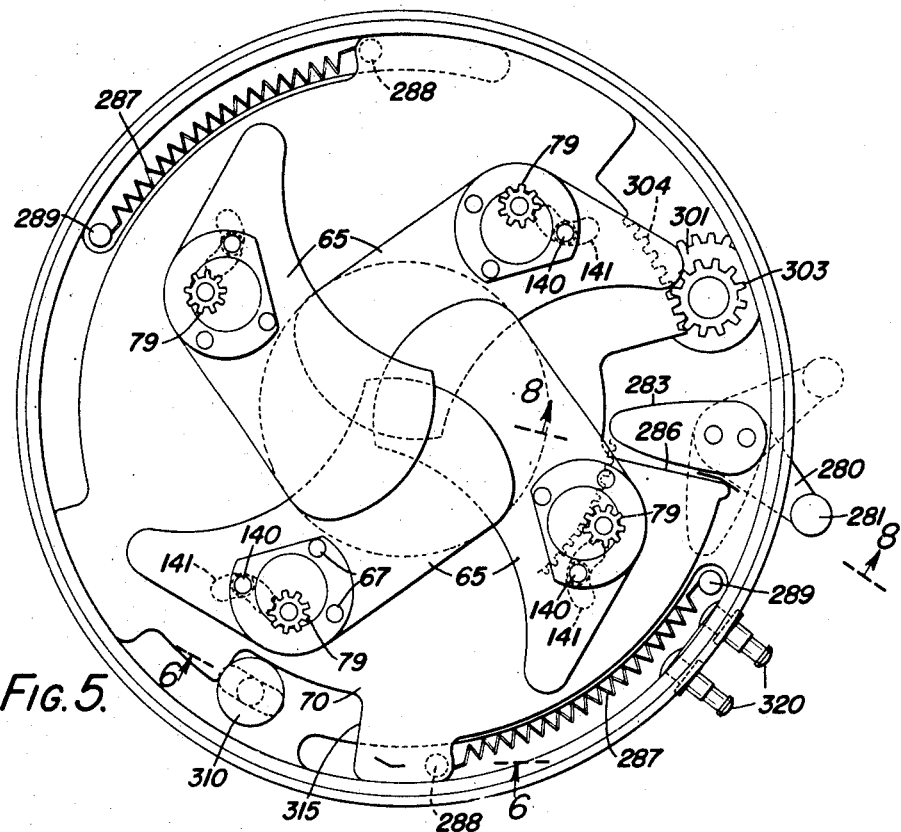
Fig. 5 is a transverse sectional view of the shutter on a smaller scale than Fig. 4, showing the shutter leaves closed and illustrating their mounting and actuating mechanism.
Figure 7:
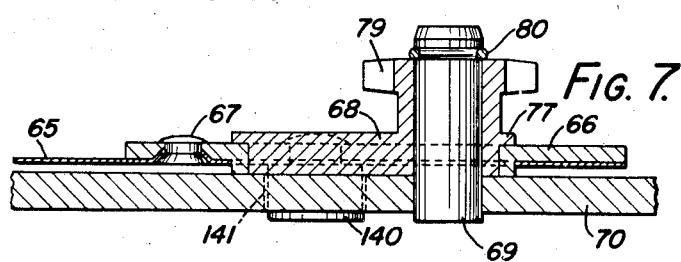
Fig. 7 is a greatly enlarged view showing fragmentarily one of the shutter leaves, its mounting, and its driving mechanism.
Figure 8:
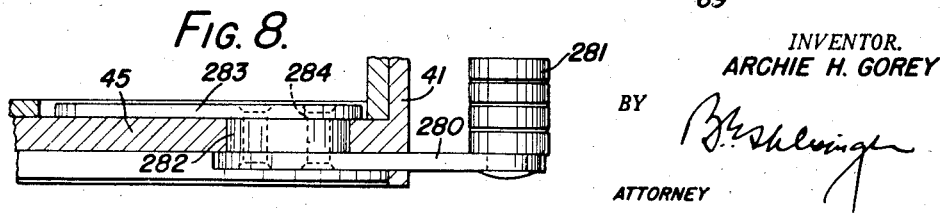
Fig. 8 is a fragmentary sectional view on an enlarged scale taken on the line 8—8 of Fig. 5 and showing the lever for opening the shutters to focusing position.

In the embodiment of the invention shown there are four shutter leaves 65 (Figs. 4, 5 and 7). These are designed, as shown in Fig. 5, so that they overlap, when in closed position, to prevent passage of light from the forward lens element to the rear lens element and the sensitive medium of the camera. Each shutter leaf 65 is secured to a hub 66 in any suitable manner, as by rivets 67. Each hub fits rotatably on an eccentric member 68 that is journaled on a stud 69 which, in turn, has a pressed fit in a shutter leaf plate 70. The leaf plate 70 is rotatably movable in the casing 52, but is held against axial movement relative to the casing 52 by a mechanism plate 75 that is secured to the casings 41 and 52 by screws 76 (Fig. 4). Each eccentric 68 has a flange 77 for retaining the associated shutter leaf against axial movement, the hub of each shutter leaf being held between the associated flange 77 and the shutter leaf plate 70. Formed integral with each eccentric 68 is a spur pinion 79. A snap ring 80 serves to hold each pinion 79 and its eccentric 68 on its stud 69.

The several pinions 79 mesh with a spur master gear 85 (Fig. 4) which is journaled on the hub portion 58 of the casing 52 and which is integral with a toothed ring 86.

The internal gear 61 (Figs. 4, 9 and 10) meshes with a spur pinion 90 that is secured to a shaft 91 which is journaled in the lens casing 52. The shaft 91 has integral with it a spur pinion 92 which meshes with a spur gear 93 that is secured to a shaft 94 which is also journaled in casing 52, parallel to shaft 92. The shaft 94 has integral with it a spur pinion 95 that meshes with a spur gear 96 which is secured to a shaft 97 also journaled in casing 52. A spur pinion 98 is integral with the shaft 97. This pinion meshes with a spur gear 99 (Fig. 4) which is journaled on the hub portion 58 of casing 52. This spur gear 99 has two diametrically opposite studs 100 (Figs. 4 and 12) secured in it. Secured to each stud is one end of a coil spring 105. Each of these coil springs is secured at its opposite end to a stud 106. The two studs 106 are diametrically opposite and are riveted in the portion 86 of master gear 85.

The shutter mechanism of the present invention is designed to be actuated by the springs 105, the springs being wound-up by rotating ring 60 to cock the shutter, and operating, when the shutter mechanism is tripped, to drive the master gear 85 (Fig. 4) and, through the master gear, the pinions 79 (Fig. 7), thus causing the shutter leaves to be opened and then closed, the mechanism operating in this particular like the mechanism of my U. S. Patent No. 2,593,873, granted April 23, 1952.

The shutter mechanism is wound up by manually rotating the knurled ring 60. Through rotation of the ring 60 the gear train 90, 92, 93, 95, 96, 98 (Figs. 9, 10 and 11) is driven to cause the gear 99 to be rotated relative to the master gear 85 and stretch the springs 105.

The amount of the winding movement of the gear 99 is limited by stud 100 catching up with stud 106. Gear 99 is prevented from reversing by a stop dog 110 (Figs. 9 and 11). This dog is pivotally mounted on a stud 111 in the casing 52. This dog is adapted to engage against the shoulder 113 of a cam 112. The dog is held in engagement with the cam by a spring 114 which is coiled about the pin 115 and which has one end engaged in the hole 116 in plate 52 and its opposite end engaged against the back of the dog. Pin 115 is secured in the plate 52.

The cam 112 is secured to a shaft 117 that is journaled in casing 52 and mechanism plate 75. It has a pinion 118 (Fig. 11) integral with it which meshes with the gear 99. Hence, as the spring gear 99 is rotated to wind the shutter mechanism, the cam 112 is rotated also. When the pinion 118 has made a revolution, then, during winding of the shutter mechanism, the dog 110 will engage the shoulder 113 of the cam 112 and prevent reversing.

The cover plate 53 (Fig. 4) holds the winding ring 60 in place and prevents the spring 114 (Fig. 9) from coming off. The gear 99 is held against the casing 52 by a snap ring 119 (Fig. 4) which engages in a peripheral groove in the cylindrical flange portion 58 of the casing. A nut 88, which threads into the lens casing 58, serves to hold the master gear 85 and toothed plate 86 against a shoulder on the lens casing 58.

The master gear 85 is locked against rotation with the gear 99 during the winding operation, by means fully described in my copending parent application, Serial No. 147,481, above mentioned. A trigger 138 (Figs. 1 and 2), which is adapted to be actuated manually, serves to disengage the locking mechanism, as described in my above-mentioned parent application, thereby releasing the master gear 85 (Figs. 4 and 12). The springs 105 then take over and drive the master gear 85, causing the master gear to rotate the pinions 79 (Figs. 4, 5 and 7).

There is a pin 140 secured to each shutter leaf hub 66 (Figs. 5 and 7), and each pin 140 engages in an arcuate slot 141 in the shutter leaf plate 70. As the pinions 79 are rotated by the master gear 85, then, each leaf rotates in an oscillating manner due to the throw of its eccentric 68 and the constraining influence of its pin 140 and the associated slot 141. Hence, as the pinions 79 rotate, the shutter leaves, which are closed when the spring plate 99 is wound, are first opened and then closed again. During the time that the shutter leaves are open the sensitive medium in the camera is exposed. The action of the eccentrics 68, pins 140 and slots 141 in the opening and closing of the shutter leaves is the same as in my prior patent above-mentioned and need not further be described here.

When the camera, on which the present mounting is employed, is equipped with a range finder or a view finder and these devices are used, the shutter need not be opened for focusing. When critical focusing is required on ground glass, however, the shutter is opened. The shutter mechanism of the present invention is so constructed that it can be opened wide for focusing without disturbing the setting or tripping lever or any other mechanism.

For opening the shutter for focusing, a lever 280 that is manually operable by means of a handle 281, is provided (Figs. 1, 3, 5 and 8). This lever extends through a slot 285 in the casing 41 and is secured to a bearing 282 which is journaled in the flange portion 45 of the casing. It has an arm 283 secured to it by means of rivets 284. The arm is adapted to bear against the surface 286 (Fig. 5) of the shutter plate 70. When the lever 280 is rocked from the full line position shown in Fig. 5 to the dotted line position, then, the shutter plate 70 is turned in a clockwise direction against the resistance of the two diametrically opposed springs 287. The springs 287 are each connected at one end to a pin 288 secured in the shutter plate and at their opposite ends to a pin 289 secured in the casing 41.

As the shutter plate 70 moves, it carries with it the shutter leaves 65, causing the pinions 79 (Figs. 4 and 7) to roll on the master gear 85, which is shown only fragmentarily in Fig. 5, thereby causing the shutter leaves to open fully to focusing position. The lever 280 only shoves the shutter leaf plate 70 approximately half way of its full movement in the cycle of opening and closing of the shutters. The shutter leaves are locked in focusing position by reason of the fact that the lever 280 has passed over dead center. To close the shutters, the lever is returned to original position.

The diaphragm of the shutter forms no part of the present invention. It comprises overlapping leaves 290 (Fig. 4). Each leaf has a pin 291 integral with it which engages, as described in my parent application above mentioned, in a cam slot of a diaphragm setting ring 295.

The cam plate 295 is rotatably adjustable by movement of the index lever 296 (Figs. 1 and 3) which extends through a slot in the casing 41 and which registers against a graduated plate 297 that is secured to the outside of the casing.

The plate 294 (Fig. 4), in which the diaphragm leaves 290 of the shutter are pivoted, is operatively connected, as described in my parent application above mentioned, to the shutter leaf plate 70 (Fig. 5) through a gear which is provided on the periphery of the plate 294, the pinion 301 which meshes therewith, the pinion 303 which is integral with pinion 301, and the gear segment 304 which is integral with the shutter leaf plate 70. Hence, as the shutter leaf plate 70 is moved by the lever 280 to open the shutter leaves to focusing position (Fig. 5), the diaphragm pivot plate 294 is also rotated. This opens the diaphragm leaves wide to focusing position simultaneously with the opening of the shutter leaves to focusing position, as described in my parent application above mentioned.

Figure 6:
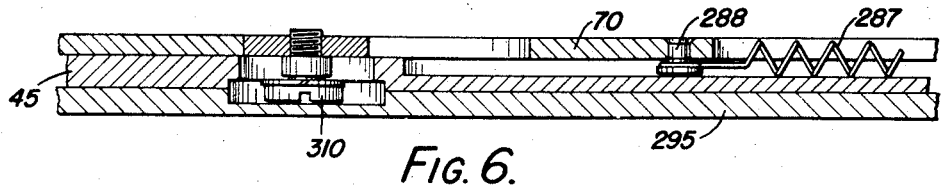
Fig. 6 is an enlarged fragmentary sectional view taken substantially on the line 6—6 of Fig. 5.

The shutter leaf plate 70 and the cam plate 294 are held in open position, after the lever 280 has passed dead center, by the springs 287 (Fig. 5.) The shutter leaf plate returns to closed position against a stop 310 (Figs. 5 and 6) which is secured in the flange 45 of casing 41 and which is adapted to abut against a surface 311 on shutter leaf plate 70.

To prevent tripping of the shutter when the shutter and diaphragm leaves are open for focusing, a cam surface 315 (Fig. 2) is provided on the shutter leaf plate 70. This surface is moved up against a pin on the trigger lever 138 when the shutter leaf plate is moved to focusing position, as described in my patent application above mentioned. This prevents the trigger from being tripped as long as the shutter and diaphragm leaves are in focusing position.

Combination lever and pointer 166 (Figs. 2 and 4), which extends through a slot 167 in casing 41 and which reads against graduated plate 168, serves to adjust the shutter speed as described in my parent application above mentioned. As described in my patent application, a flash synchronization mechanism is incorporated in the shutter. Since it forms no part of the invention of the subject matter of the present application it will not be described in detail here. Button 270 (Fig. 1) is adjustable to control the time of delay of flash when a flashlamp is ignited in synchronism with the operation of the shutter. This button has an index line 271 on it which is set opposite the letter M when a class M type of flash lamp is used, and which is set opposite the line 272 between F and X when a high speed type of lamp is being used. The flashlamp is connected to the flash synchronization mechanism of the shutter through terminals 320. Parts 150, 151 and 158 shown in Fig. 11 are parts of the snubbing or cushioning mechanism for dampening the closing movement of the shutter at the end of an exposure cycle, as described in my parent application. Since these, also, form no part of the invention covered by the present application they are not described in detail here.

While the operation of the shutter mechanism will be apparent from the preceding disclosure it may be briefly summed up here.

The shutter is wound up my manually rotating the ring 60. This stretches the springs 105 (Fig. 12). The amount of movement of the ring is limited by the interference of pins 100 and 106 (Fig. 12) to a distance which will produce a single revolution of cam 112. When the trigger 130 is tripped, the springs 105 (Fig. 12) drive master gear 85 and its toothed rim 86. The master gear is driven through a distance not exceeding a pitch of toothed rim 86. During this movement, the pinions 79 (Fig. 5) are rotated to first open and then close the shutter leaves 65.

For so-called "press-focusing," lever 280 (Figs. 1, 2 and 5) is rocked to rotate shutter leaf plate 70 and through gearing 304, 303, 301 rotates plate 294. Movement of the shutter leaf plate causes the pinions 79 (Figs. 5 and 4) to roll on master gear 85, opening the shutter leaves. Movement of plate 294 causes the diaphragm pivots 291 to open the diaphragm leaves. Return of lever 280 to its normal position allows spring 287 to close the shutter leaves and to return the diaphragm leaves to their previously set positions.

While the invention has been described in connection with a particular embodiment thereof, it is capable of further modification, and this application is intended to cover any adaptations, uses, or modifications of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A shutter for photographic cameras comprising a casing, a shutter leaf plate rotatably mounted in said casing, a plurality of eccentrics rotatably mounted on said plate, a plurality of shutter leaves, each of which has a circular opening to receive and embrace one of said eccentrics so that rotation of an eccentric imparts eccentric rotary motion to the associated shutter leaf, a pin secured to each shutter leaf and engaging in a guide member on said plate, a pinion rigidly secured to each eccentric, a drive gear with which all said pinions mesh, a cocking ring rotatably mounted in said casing coaxial with said drive gear, a coil spring connecting said drive gear and ring, manually releasable means for holding said drive gear against rotation while said ring is being rotated to cock said spring and shutter, means for locking said ring against retrograde movement, the last-named means including a member geared to said ring to be movable into operative position upon rotation of said ring a predetermined distance relative to said drive gear, a stop for limiting the movement of said drive gear under impetus of said spring after the drive gear is released, said stop being so positioned that each pinion and eccentric make one revolution before the drive gear is stopped, and a lever operatively connected to said plate and operable on pivotal movement in one direction for rotating said plate in one direction to roll said pinions on said drive gear and rotate said eccentrics through approximately half a revolution only to open said shutter leaves for focusing.

2. A shutter for photographic cameras comprising a casing, a shutter leaf plate rotatably mounted in said casing, a plurality of eccentrics rotatably mounted on said plate, a plurality of shutter leaves, each of which has a circular opening to receive and embrace one of said eccentrics so that rotation of an eccentric imparts eccentric rotary motion to the associated shutter leaf, a pin secured to each shutter leaf and engaging in a guide member on said plate, a pinion rigidly secured to each eccentric, a drive gear with which all said pinions mesh, a cocking ring rotatably mounted in said casing coaxial with said drive gear, a coil spring connecting said drive gear and ring, manually releasable means for holding said drive gear against rotation while said ring is being rotated to cock said spring and shutter, a rotary cam member having a peripheral cam surface disposed at a varying radial distance from its axis and having a locking shoulder connecting the portions of said cam surface which are at maximum and minimum radial distances, respectively, from said axis, gearing connecting said cam member to said ring to rotate said cam member through one revolution upon rotation of said ring to cocking position, a spring-pressed detent mounted to ride on the peripheral surface of said cam member and to engage said shoulder when said cam member has been rotated through one revolution to hold said cam member and said ring against retrograde movement, a stop for limiting the movement of said drive gear under impetus of said spring after said drive gear is released, said stop being so positioned that each pinion and eccentric make one revolution before the drive gear is stopped, and a lever operatively connected to said plate, said lever being manually pivotal in one direction for rotating said plate in one direction to roll said pinions on said drive gear and rotate said eccentrics through approximately half a revolution only to open said shutter leaves for focusing.

References Cited in the file of this patent

UNITED STATES PATENTS

| 2,168,893 | Aiken | Aug. 8, 1939 |
| 2,354,168 | Aiken | July 18, 1944 |
| 2,480,973 | Schwarz | Sept. 6, 1949 |
| 2,593,873 | Gorey | Apr. 22, 1952 |